Nov. 8, 1966   L. M. GOFF   3,284,100
BUFFER DEVICE FOR PUSHER VEHICLES
Filed March 1, 1965

INVENTOR
Lewis M. Goff

BY
Lane, Aitken, Dunner & Ziems
ATTORNEYS

United States Patent Office 3,284,100
Patented Nov. 8, 1966

3,284,100
BUFFER DEVICE FOR PUSHER VEHICLES
Lewis M. Goff, 3250 NW. 36th St., Miami, Fla.
Filed Mar. 1, 1965, Ser. No. 435,886
6 Claims. (Cl. 280—481)

This invenation relates to buffer devices for pusher vehicles and more particularly, it concerns a resiliently supported pusher plate to be mounted on the front end of a service vehicle to facilitate pushing a disabled vehicle, for example.

It is conventional practice for the owners and operators of gasoline stations and other automotive servicing installations to retain on hand an emergency vehicle such as a light truck or wrecker for responding to the calls of persons whose vehicles are disabled on the road or other locations remote from the service installation. Although such emergency vehicles are equipped in varying degrees with apparatus for towing disabled vehicles, it has been customary to arrange an enlarged pusher plate on the front bumper of the emergency vehicle to facilitate pushing a disabled vehicle short distances merely by driving the emergency vehicle against the front or rear bumper ot the disabled vehicle as the particular situation may require. The function of the enlarged pusher plate has been primarily to avoid problems arising due to misalignment of the bumpers on the pusher vehicle and those on the disabled vehicle to be pushed.

In the past, such pusher plates have most commonly been made of wood and rigidly attached to the front bumper of the emergency or pusher vehicle. While such plates have operated satisfactorily from the standpoint of overcoming the problem of misaligned bumpers, they have been found to suffer certain disadvantages. For example, the rigid interconnection of these pusher plates to the front bumper of the emergency or service vehicle in no way buffs or cushions the impact which necessarily occurs not only when the pusher vehicle first engages the disabled vehicle, but also during pushing due to the pushed vehicle moving away quite frequently from the pusher plate and being re-engaged thereby. Moreover, when it is necessary to push a disabled vehicle through a sharp turn or the like, the pusher plate being rigidly mounted on the bumper of the pusher vehicle, does not establish firm contact with the bumper of the vehicle being pushed but rather engages the pushed vehicle bumper only at one isolated point. This factor coupled with the rigid mounting of the pusher plate can and often does crease or otherwise mar the appearance of the pusher vehicle bumper.

In accordance with the present invention, many of the problems heretofore experienced with pusher plates of the type referred to are alleviated by mounting an improved pusher or buffer plate to the front bumper of the pusher vehicle for limited universal movement relative thereto. Buffer springs are interposed between the buffer plate and the mounting means rigidly attached to the pusher vehicle front bumper so that impacts received by the buffer plate are cushioned or absorbed.

It is therefore a principal object of the present invention to provide a buffer device for pusher vehicles by which the problems previously incurred with devices of the type heretofore available are effectively and substantially overcome.

Another object of this invention is the provision of a buffer device of the type aforementioned which facilitates a sufficient degree of pivotal movement about a vertical axis so that the front face of the buffer plate remains fully in contact with the bumper of the vehicle being pushed even around tight curves.

A further object of this invention is the provision of a buffer device of the type aforementioned in which the buffer plate is mounted for substantially universal movement against a spring bias so that a degree of resiliency is afforded for absorbing impacts received anywhere over the front surface of the buffer plate.

Another object of this invention is that of providing a buffer device of the type aforementioned which is easily assembled and readily mounted on the front bumper of a conventional automotive vehicle.

Still another object of this invention is the provision of an improved buffer plate assembly for use with pusher vehicles of the type referred to.

Other objects and further scope of applicability of the present invention will become apparent from the detailed description to follow taken in conjunction with the accompanying drawings in which.

Figure 1:
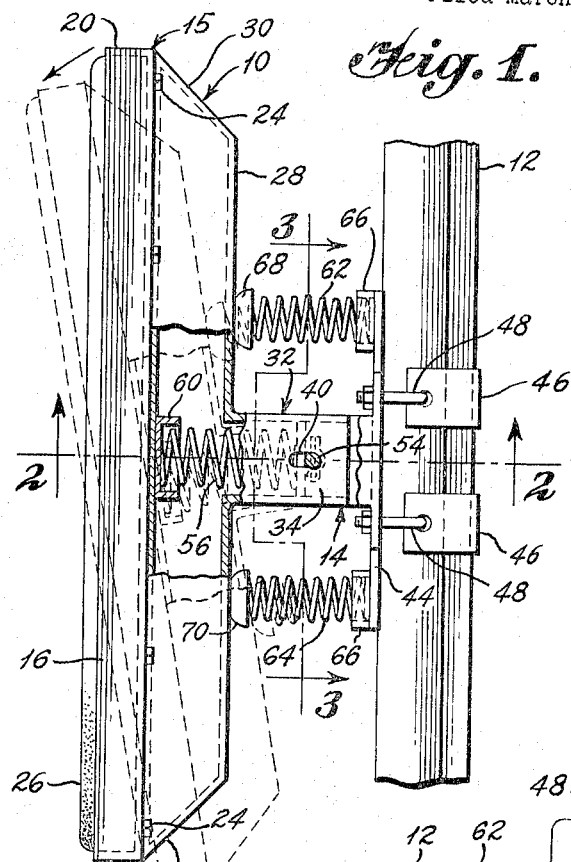
FIG. 1 is a plan view in partial cross-section of the buffer device of this invention.
Figure 2:
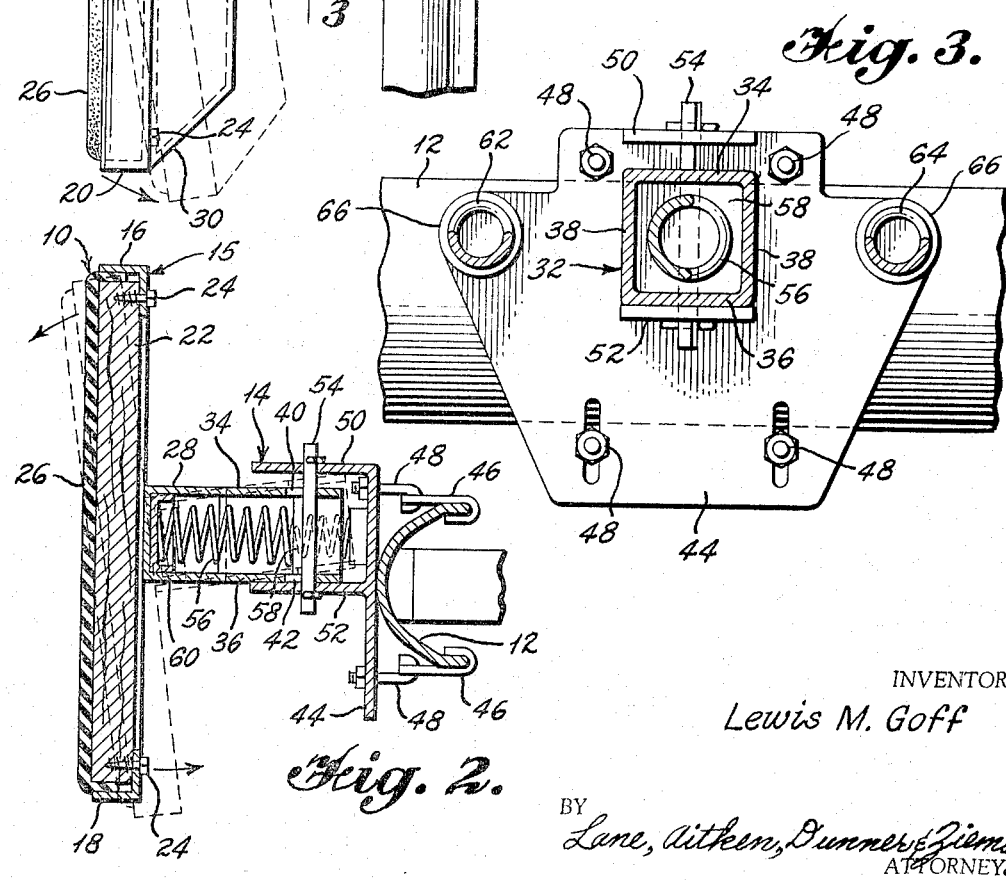
FIG. 2 is a cross-section taken along line 2—2 of FIG. 1.

As shown in the drawings and particularly in FIGS. 1 and 2 thereof, a buffer device constructed in accordance with this invention includes a buffer plate generally designated by the reference numeral 10 and adapted to be secured to the front bumper 12 of an automotive vehicle such as a truck or the like (not shown) by a clevis-type mounting assembly generally designated by the reference numeral 14. The buffer plate 10 includes a generally rectangular, angle-iron frame 15 established by top and bottom members 16 and 18 respectively, secured at their ends, such as by welding, to side members 20. A filler 22 is received within the frame 15 and secured in place by a suitable means such as screws 24 extending through apertures in the transversely disposed flange members of the respective top, bottom and side angle-iron members 16, 18 and 20. The filler member may be formed of any suitable material such as wood, synthetic plastics and the like. As shown most clearly in FIG. 2 of the drawings, the filler member 22 is dimensioned to be slightly smaller than the frame to enable the edges of a rubber scuff plate 26 to be received between the filler and the forwardly projecting flanges on the angle members establishing the frame 15. It will be appreciated that the scuff plate, being formed of rubber or rubber-like material, will serve to provide a resilient contacting surface for engaging the bumper of a disabled vehicle to be pushed without scuffing, marking or otherwise damaging the finish on the bumper.

Figure 3:
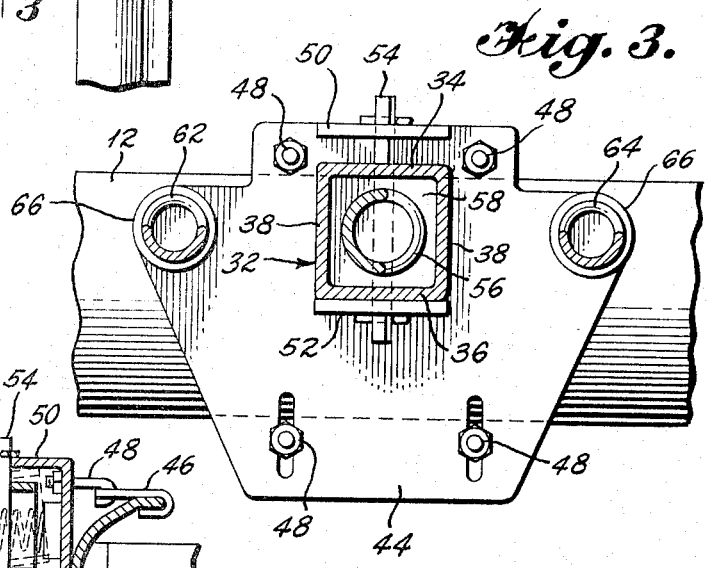
FIG. 3 is an enlarged fragmentary cross-section taken along line 3—3 of FIG. 1.

Extending centrally across the back of the buffer plate 10 is a tubular beam 28 having bevelled ends 30 and suitably secured such as by welding to the side frame members 20. The beam 28 functions to strengthen the frame 15 and also to support a rearwardly extending tubular member 32 having top, bottom and side walls 34, 36 and 38 respectively as shown in FIG. 3. Although the tubular member in the embodiment shown is of rectangular or square cross-section, it will be appreciated by those skilled in the art that the tubular member 32 may be of other specific shapes and forms without departing from the true spirit and scope of this invention. As shown in FIGS. 1 and 2 of the drawings, the top and bottom walls 34 and 36 of the tubular member are provided with longitudinally disposed and aligned slots 40 and 42 respectively for mounting purposes as will be more completely understood from the description of the mounting assembly 14 to follow below.

In the embodiment shown, the mounting assembly 14 includes a mounting plate 44 having a "keystone" configuration and adapted to be mounted against the bumper 12 by clips 46 and J-bolts 48 extending through apertures in the plate 44 appropriately formed to facilitate adaptability to different sizes of bumpers. Integrally formed on the front of the plate 44 is a pair of spaced flanges 50 and 52 having aligned apertures therein for the reception of a clevis pin 54. As shown most clearly in FIG. 2, the clevis pin 54 extends through both the flanges 50 and 52 and as well, through the slots 40 and 42 in the respective upper and lower walls 34 and 36 of the rearwardly extending tubular member 32 to establish a clevis connection between the buffer plate 10 and the mounting plate 44. It will be appreciated therefore, that the tubular member 32 and thus the buffer plate 10 is mounted for pivotal movement about the axis of the clevis pin 54. It will be noted further however (see FIGS. 2 and 3) that the outside vertical dimension of the tubular member 32 is substantially less than the distance between the mutually facing interior surfaces of the flanges 50 and 52 so that a substantial amount of play is afforded between the tubular member and the flanges. This play together with the slots 40 and 42 facilitate additional but limited pivotal movement of the tubular member about a transverse axis extending through the clevis pin 54. Thus, it will be appreciated that the mounting assembly 14 facilitates substantially universal pivotal movement of the tubular member 32 and thus of the buffer plate 10 relative to the bumper 12.

To retain the buffer plate 10 in a generally erect or vertical normal position parallel to the mounting plate 44 and the bumper 12, and also to absorb impacts received by the buffer plate, a coil spring arrangement is provided to extend between the mounting plate 44 and the buffer plate 10. More specifically, and in the embodiment shown this spring assembly includes a primary coil spring 56 disposed within the tubular member 32 between an abutment plate 58 engaged by the clevis pin 54 and a cup-shaped member 60 secured to the forward wall of the beam 28. The spring 56, being compressed between the plate 58 and the cup-shaped member 60, will function to hold the buffer plate 10 in its normal erect position by urging the rearward ends of the slots 40 and 42 against the clevis pin 54. The spring 56 will also function to cushion or absorb impacts received head-on by the pusher plate by permitting movement of the pusher plate rearwardly through a distance established by the length of the slots 40 and 42.

Additional coil springs 62 and 64 are mounted in sockets 66 and secured such as by bolts or welding to the plate 44. The springs 62 and 64 are each provided with caps 68 and 70 for abutting against the rear wall of the beam 28. The springs 62 and 64 therefore serve to restrain the buffer plate 10 resiliently in a position parallel to the bumper 12. Also, these springs augment the impact absorbing characteristics of the spring 56 when the buffer plate 10 is unevenly loaded relative to a vertical center line.

In use, the buffer device in accordance with this invention is mounted on the front bumper 12 by tightening the J-bolts 48 so as to seize the bumper 12 between the clips 46 and the rear face of the mounting plate 44. When pushing a vehicle, the disabled vehicle bumper is engaged by the scuff plate 26 and the buffer plate 10 will be moved against the bias of springs 56, 62 and 64 to any one of several conforming positions illustrated by the phantom lines in FIGS. 1 and 2 of the drawings. In other words, when the disabled vehicle is at an angle to the pushing vehicle such as when going around turns or the like, the buffer plate will assume a position somewhat like that shown in phantom lines in FIG. 1. In this case, the springs 56 and 64 will be stressed to absorb the forces moving the pad to this position and also to return the pad to its normal position when these forces are removed. If, on the other hand, the bumper of a disabled vehicle is lower than the bumper 12 of the pusher vehicle, the buffer plate 10 will be constrained to the position illustrated by phantom lines in FIG. 2. In so moving the plate 10 to this position however the spring 56 is stressed again to absorb the impact forces incurred on contact and also to restore the pad to its previous erect normal position.

In view of the foregoing description will be appreciated that by this invention an improved buffer device for pusher vehicles is provided and by which the abovementioned objectives are completely fulfilled. Moreover, it will be appreciated that various changes and modifications of the invention as described above can be made without departing from the true spirit and scope of the present invention. For example, although the slots 40 and 42 in the embodiment described are formed in the tubular member 32, it is contemplated that the aligned apertures in the flanges 50 and 52 might be elongated as slots in lieu of or in addition to the slots 40 and 42. Also the arrangement of flanges on the mounting plate 44 and tubular member on the buffer plate 10 might be reversed in some instances, though the described embodiment is preferred from the standpoint of ease of assembly, proper concentration of strength and the like. It is to be understood therefore, that the foregoing description is illustrative only, not limiting, and that the true scope of the present invention will be determined by reference to the appended claims.

The invention claimed is:

1. A buffer device for pusher vehicles comprising: a buffer plate; a mounting plate adapted to be secured rigidly to the front end of a pusher vehicle; a clevis connection between said buffer plate and said mounting plate, said clevis connection including overlapping members projecting rearwardly from said buffer plate and forwardly from said mounting plate respectively, each of said members having vertically aligned apertures formed therein, the apertures in at least one of said members being longitudinally extending slots, and pin means in said apertures extending through said members; and compression spring means acting between said plates to retain said plates in a normally parallel position.

2. The apparatus recited in claim 1 in which said buffer plate comprises: a generally rectangular frame of angle members having forwardly and transversely extending flanges, a filler plate secured in said frame, and a scuff plate covering the front of said filler member.

3. A buffer device for pusher vehicles comprising: a generally rectangular plate assembly having top, bottom and side edges; a tubular member secured centrally to and extending normally from the rear surface of said plate assembly, said tubular member having aligned axially extending slots formed in the top and bottom walls thereof; a mounting plate adapted to be secured to the front of a pusher vehicle and having forwardly projecting upper and lower flanges formed thereon and spaced to receive said tubular member in loose telescopic fashion, said flanges having vertically aligned apertures formed therein; a clevis pin extending through said apertures and said slots whereby said tubular member is movable pivotally about the axis of said pin and also about a transverse axis through said pin by virtue of said slots and the loose telescopic reception of said tubular member between said flanges; a buffer compression spring in said tubular member between said pin and said pad assembly; and a pair of equalizer springs one on each side of said tubular member and extending between said mounting means and said pad means.

4. The apparatus recited in claim 3 including a transverse tubular beam extending centrally across the rear face of said buffer plate, said tubular member being fixed to the rear wall of said beam and opening therethrough.

5. The apparatus recited in claim 4 in which said equalizer springs abut the rear wall of said beam.

6. A buffer device for pusher vehicles comprising: a generally rectangular plate assembly having top, bottom and side edges; means defining a pair of spaced walls extending normally from the rear of said plate assembly, said walls being generally parallel to each other and to the top and bottom edges of said plate assembly and each having an elongated slot formed therein; mounting means for securing said plate assembly to the front of a pusher vehicle, said mounting means including forwardly projecting upper and lower flanges thereon, said flanges having aligned apertures formed therein, and a clevis pin extending through said apertures and said slots; and compression spring means between said plate assembly and said mounting means, the mutually facing surfaces of said flanges being spaced apart by a distance substantially greater than the external faces of said walls to cooperate with said slots and said pin for enabling limited pivotal movement of said walls about a transverse axis extending through said pin as well as pivotal movement about the longitudinal axis of said pin.

References Cited by the Examiner
UNITED STATES PATENTS

| | | | |
|---|---|---|---|
| 2,646,287 | 7/1953 | Kytola | 280—481 |
| 2,679,405 | 5/1954 | Snyder | 280—481 |

References Cited by the Applicant
UNITED STATES PATENTS

| | | |
|---|---|---|
| 1,855,977 | 4/1932 | Llobet. |
| 2,128,656 | 8/1938 | Long. |
| 2,137,914 | 11/1938 | King. |
| 2,593,586 | 4/1952 | Maag. |
| 2,606,785 | 8/1952 | Fisher. |
| 2,873,994 | 2/1959 | Omps. |

LEO FRIAGLIA, *Primary Examiner.*